US011033035B2

(12) United States Patent
Van Steijn et al.

(10) Patent No.: US 11,033,035 B2
(45) Date of Patent: Jun. 15, 2021

(54) SLAUGHTER INSTALLATION FOR POULTRY SUSPENDED BY THE LEGS

(71) Applicant: Meyn Food Processing Technology B.V., Oostzaan (NL)

(72) Inventors: Aloysius Christianus Maria Van Steijn, Oostzaan (NL); Joy David Mike Van Spall, Oostzaan (NL); Ramzi Souli, Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 2 days.

(21) Appl. No.: 16/582,832

(22) Filed: Sep. 25, 2019

(65) Prior Publication Data

US 2020/0093144 A1 Mar. 26, 2020

(30) Foreign Application Priority Data

Sep. 26, 2018 (NL) .................................... 2021716

(51) Int. Cl.
*A22B 3/00* (2006.01)
*A22B 3/08* (2006.01)
*A22B 3/10* (2006.01)
*A22B 7/00* (2006.01)

(52) U.S. Cl.
CPC .................. *A22B 3/08* (2013.01); *A22B 3/10* (2013.01); *A22B 7/001* (2013.01); *A22B 7/003* (2013.01)

(58) Field of Classification Search
CPC .... A22B 3/00; A22B 3/08; A22B 3/10; A22B 7/001; A22B 7/003; A22B 21/0015; A22B 21/00; A22B 21/0053

USPC .... 452/21–26, 30–32, 35–37, 46–48, 51, 53
See application file for complete search history.

(56) References Cited

U.S. PATENT DOCUMENTS

| | | | | |
|---|---|---|---|---|
| 2,993,228 A | * | 7/1961 | Zebarth | A22C 21/0023 452/167 |
| 3,213,488 A | * | 10/1965 | Volpe | A22C 21/06 452/167 |
| 3,571,845 A | | 3/1971 | Martin et al. | |
| 3,724,032 A | * | 4/1973 | Harben, Jr. | A22C 21/0015 452/63 |
| 4,184,230 A | * | 1/1980 | Fox | A22C 21/0023 452/120 |

(Continued)

FOREIGN PATENT DOCUMENTS

WO WO2011126366 10/2011

OTHER PUBLICATIONS

International Search Report for Netherlands Application No. 2021716 dated Apr. 16, 2019, 10 pages.

*Primary Examiner* — Richard T Price, Jr.

(74) *Attorney, Agent, or Firm* — Dority & Manning, P.A.

(57) ABSTRACT

Slaughter installation including a conveyor line with carriers for suspending poultry by the legs and conveying the poultry in a conveying track. Head positioning means arranged for forcing the bill of the poultry in a direction opposite to the transport direction of the suspended poultry. Killing device having at least a first rotary knife positioned alongside of the conveying track for cutting into the neck of the suspended poultry while avoiding to cut a certain parts. A first guide wheel upstream and proximate to the first rotary knife, which first guide wheel is positioned alongside the conveying track. A passageway between the first rotary knife and the first guide wheel through which the poultry neck is able to pass.

9 Claims, 2 Drawing Sheets

(56) References Cited

U.S. PATENT DOCUMENTS

| | | | | |
|---|---|---|---|---|
| 4,354,296 A * | 10/1982 | Robinson | ............ | A22C 21/0015 |
| | | | | 452/53 |
| 4,894,885 A * | 1/1990 | Markert | ................. | A22B 3/086 |
| | | | | 452/53 |
| 2001/0034200 A1* | 10/2001 | Clark | ................. | A22C 21/0061 |
| | | | | 452/106 |
| 2011/0059684 A1* | 3/2011 | Van Den Nieuwelaar | ................... | |
| | | | | A22C 21/0092 |
| | | | | 452/127 |
| 2013/0052923 A1* | 2/2013 | Cornelissen | ....... | A22C 21/0053 |
| | | | | 452/53 |

* cited by examiner

SLAUGHTER INSTALLATION FOR POULTRY SUSPENDED BY THE LEGS

PRIORITY STATEMENT

The present application claims priority under 35 U.S.C. § 119 to Dutch patent application No. 2021716, filed Sep. 26, 2018.

FIELD OF THE INVENTION

The subject matter of the present disclosure relates generally to a slaughter installation for poultry.

BACKGROUND OF THE INVENTION

A slaughter installation is known from the European patent EP-B-2 555 628. It is essential, according to this patent, that the head positioning means comprise a back neck guide along which the backside of the neck of the poultry is guided, and a breast neck guide along which the breast side of the neck of the poultry is guided, and that both the neck guides extent essentially parallel to the transport direction such that the neck is guided in a plane between the neck guides, wherein the back neck guide is positioned at an elevated position relative to the lower positioned breast neck guide, and that the positioning means further comprise a head guide track extending essentially parallel to the transport direction, along which head guide track the lower portion of the head of the suspended poultry is guided while the poultry is conveyed between the neck guides, such that the bill of the poultry is forced in a direction opposite to the transport direction.

The slaughter installation of EP-B-2 555 628 is disadvantageous in several respects. A first problem of EP-B-2 555 628 is that the stationary guides of the head positioning means are prone to collect dirt and grease, which may become a source of cross-contamination between subsequently passing poultry.

A second problem of EP-B-2 555 628 is that the guides of the head positioning means exert a certain amount of friction on the necks of the passing poultry which may interfere with the general trend in the industry to increase the speed of processing and the speed at which the poultry is desired to move in the conveying track.

A third problem EP-B-2 555 628 is that the friction of the stationary guides on the neck of the passing poultry has a negative impact on the proper positioning of the neck where cuts are intended in the vein and/or artery.

U.S. Pat. No. 3,571,845 discloses a slaughter installation including a conveyor line with carriers for suspending poultry by the legs and conveying the poultry in a conveying track in a transport direction from an upstream end to a downstream end of a killing device, the poultry comprising a neck, a head and a bill, wherein the killing device of the installation includes a rotary knife for cutting into the neck of the suspended poultry and to cut through a jugular vein in the neck of the poultry while avoiding to cut the vertebra in the neck of the poultry, and wherein a guide wheel is provided proximate to the rotary knife, which guide wheel and rotary knife are positioned on the same side of the conveying track and leave a passageway between the rotary knife and the guide wheel, through which passageway the poultry neck is forced to pass whilst being forced into cutting contact with the rotary knife.

U.S. Pat. No. 3,571,845 uses neck-stretching means operable in opposition to slotted propelling means that engages the heads of chickens immediately behind the jaws and thereby stretch the skin of the neck taut for engagement by the rotary knife. The heads of the chickens are held uniformly in the slotted propelling means as moved toward the rotary knife and just prior to reaching the knife, positively driven means roll or twist the neck to dispose a side thereof lowermost in one of the slots of advancing means so as to position a jugular vein nearest the knife and thereby insure that a desired minimum depth of cut will occur which penetrates the vein but not the vertebrae.

A major disadvantage of the installation of U.S. Pat. No. 3,571,845 is its complicated construction and associated high costs. It may further be problematic to realize the twisting of the neck of the suspended poultry in time, because the positively driven guide wheel is only placed a short distance forwardly in the feeding path of the chickens relative to the peripheral portion of the knife.

Furthermore, the construction of U.S. Pat. No. 3,571,845 requires that the suspended poultry has to be bend sideways while being suspended so as to expose the poultry necks to the cooperating guide wheel and rotary knife which are placed at the same side adjacent to the conveying track. This construction stands in the way of high processing rates.

BRIEF DESCRIPTION OF THE INVENTION

In one exemplary aspect, it is an object of the invention to counter one or more of the above problems. Accordingly a slaughter installation according to one or more of the appended claims is proposed.

In one exemplary embodiment, the invention relates to a slaughter installation including a conveyor line with carriers for suspending poultry by the legs and conveying the poultry in a conveying track in a transport direction from an upstream end to a downstream end of a killing device. The poultry includes a neck, a head and a bill. This exemplary installation includes head positioning means arranged for forcing the bill of the poultry in a direction opposite to the transport direction of the suspended poultry. The killing device of the installation includes at least a first rotary knife positioned alongside of the conveying track for cutting into the neck of the suspended poultry and to cut through an artery and vein in the neck of the poultry while avoiding to cut the trachea, oesophagus and vertebra in the neck of the poultry.

In one exemplary aspect of the installation of the invention, the poultry moves in a conveyor track, and a first rotary knife is applied for cutting into the neck of suspended poultry so as to cut through an artery or vein in the neck of the poultry while avoiding to cut a trachea, oesophagus and vertebra in the neck of the poultry. At least a first guide wheel is provided upstream and proximate to the first rotary knife. In this exemplary embodiment, the first rotary knife and the first guide wheel are positioned on opposite sides of the conveying track so as to leave a passageway between the first rotary knife and the first guide wheel, through which passageway the poultry neck is able to pass while being forced into cutting contact with the first rotary knife. One of the favorable aspects of this exemplary embodiment of the invention is that this enables to maintain the poultry essentially vertically suspended while the poultry neck passes the passageway between the first rotary knife and the first guide wheel.

Whenever in this description with reference to the position of an object a term like "alongside the conveying track" or similar is used, this is meant to embrace a situation wherein the object is positioned not entirely but substantially adjacent to the conveying track while a part of the object may be in the line of at least a part of the conveying track.

With the measure of applying the first guide wheel upstream and proximate to the first rotary knife, one exemplary purpose of forcing the bill of the poultry in the direction opposite to the transport direction of the suspended poultry is secured so that an efficient and effective killing of the passing suspended poultry is provided. The applied guide wheel that is used in this embodiment for this purpose has notable advantages. The guide wheel is less sensitive to the collection of grease and dirt; the guide wheel does not exert inadvertent friction on the necks of the passing poultry; and the guide wheel is proven effective in adding a further twist to the neck of the passing poultry, which optimizes the positioning of the neck during cutting through a vein and/or artery in the neck of the passing poultry.

For this exemplary embodiment of the slaughter installation a second rotary knife can be provided alongside the conveying track, which is positioned downstream of the first rotary knife on a side of the conveying track that is opposite to the side of the first rotary knife. It can be advantageous that upstream and proximate to the second rotary knife a second guide wheel is provided, which second guide wheel is positioned alongside the conveying track on the same side of the first guide wheel and the second rotary knife. This can promote further twisting of the neck of the poultry and keeping the bill of the poultry faced in the direction opposite to the transport direction of the poultry during the cutting process, particularly when the second rotary knife is operative for cutting into the neck of the suspended poultry and cutting through an vein and/or artery in the neck of the poultry opposite to where the first rotary knife has been operative, whilst also avoiding to cut the trachea, oesophagus and vertebra in the neck of the poultry.

To avoid any doubt it is explicitly remarked that to promote the purposes of exemplary embodiments of the invention, the at least one of the first guide wheel and second guide wheel is rotatable by contacting the neck of the passing poultry.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

The invention will hereinafter be further elucidated with reference to the drawing of an exemplary embodiment of a slaughter installation according to the invention that is not limiting as to the appended claims.

In the figures.

Whenever in the figures, the same reference numerals are applied, these numerals refer to the same parts.

DETAILED DESCRIPTION OF THE INVENTION

For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

It is common knowledge that in general (live) poultry comprises not only legs but also a neck, a head and a bill.

Figure 1:
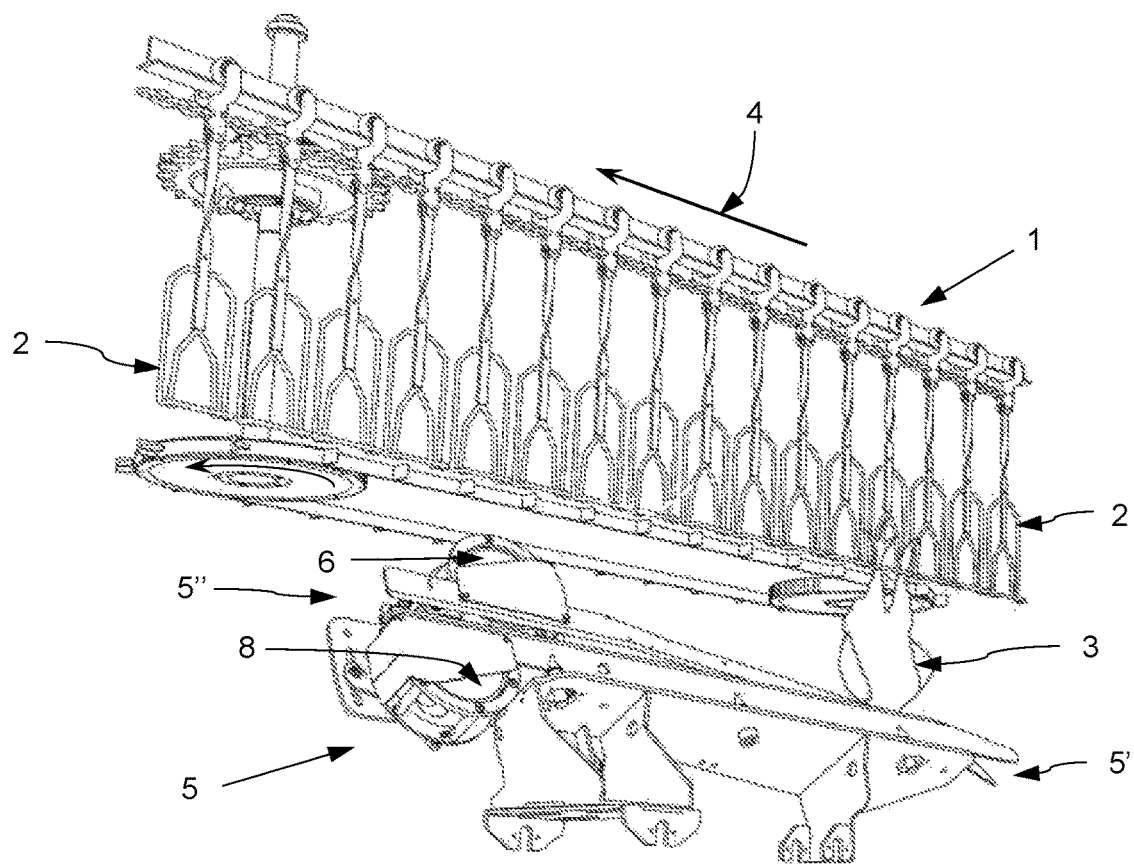
FIG. 1 shows a slaughter installation according to an exemplary embodiment of the invention in a perspective view.
Figure 2:
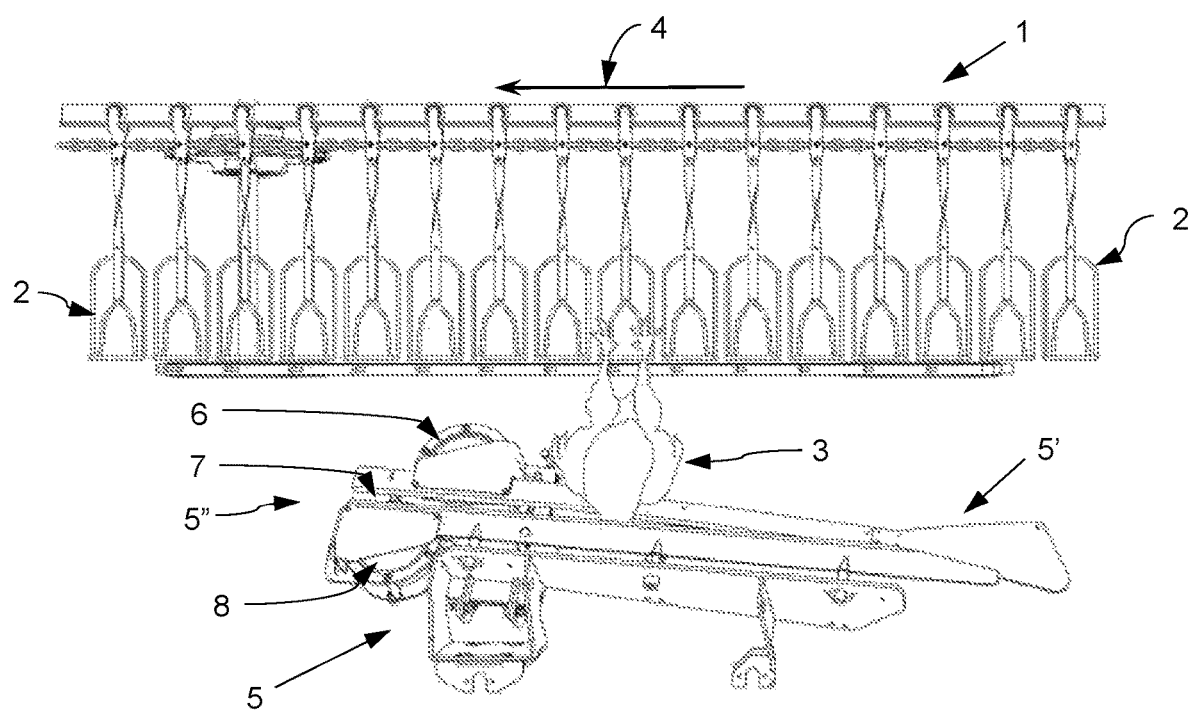
FIG. 2 shows the exemplary slaughter installation of FIG. 1 in a side view.

FIGS. 1 and 2 show a slaughter installation according to an exemplary embodiment of the invention. This embodiment includes a conveyor line 1 with carriers 2 for suspending such poultry 3 by the legs. After stunning, the poultry 3 moves in a transport direction indicated with arrow 4, wherein a neck part of the poultry 3 moves in a conveying track 7 through a slit of the killing device 5. The poultry 3 passes the killing device 5 going from an upstream end 5' to a downstream end 5" of the killing device 5. The killing device 5 is separately shown in FIGS. 3 and 4. This exemplary embodiment of the invention will further be elucidated with reference to these FIGS. 3 and 4.

Figure 3:
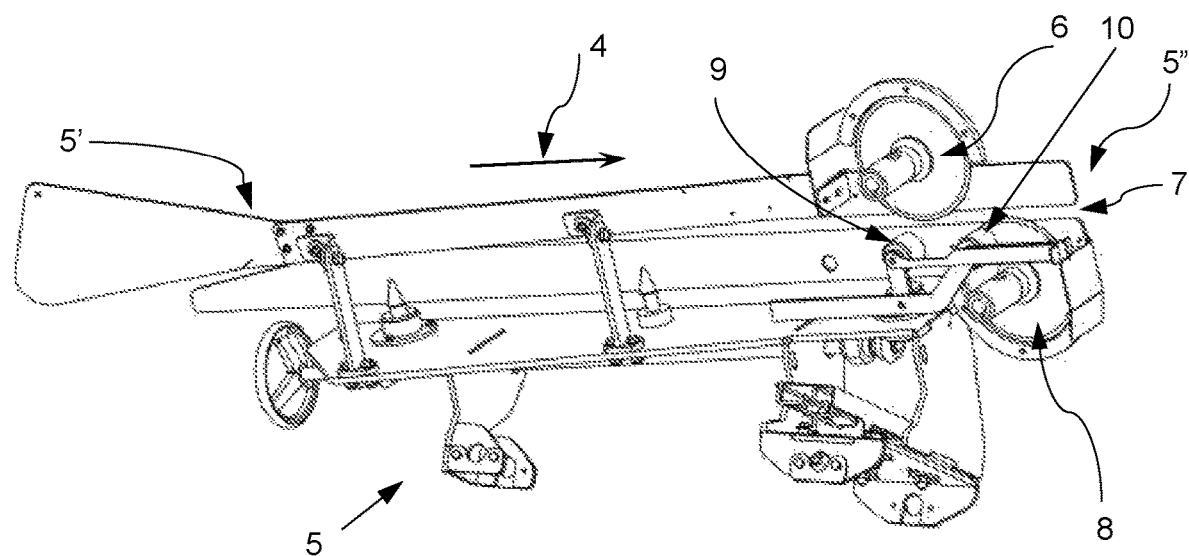
FIG. 3 shows a view from obliquely from below to the exemplary killing device of the slaughter installation of FIG. 1.
Figure 4:
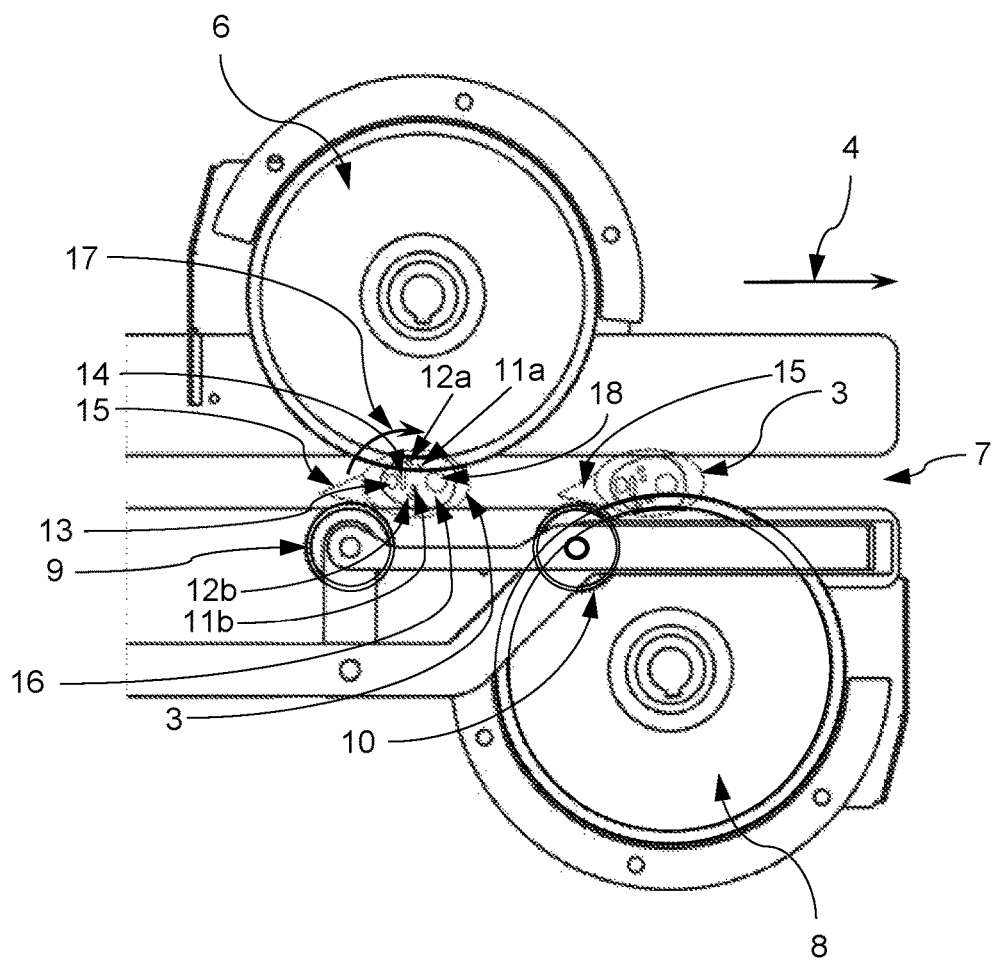
FIG. 4 shows a cross-sectional view through the exemplary killing device of FIG. 3.

FIG. 3 shows the killing device 5 from obliquely from below, and from this figure it is apparent that this exemplary killing device 5 includes at least a first rotary knife 6 positioned alongside of the conveying track 7 for cutting in-to the neck of the suspended poultry 3. This is also shown in FIG. 4, wherein a cross-sectional view is provided of both the killing device 5 and the neck 16 of the poultry 3. The body of the poultry 3 is shown in dashed lines. Also, the bill 15 of the poultry 3 is shown in a situation wherein it is just forced in a twisting motion to a direction opposite to the transport direction 4 of the suspended poultry 3. The twisting motion of the head of the poultry 3 as represented by arrow 17 is caused by a first guide wheel 9 and leads to the shown orientation of the bill 15 of the poultry 3, which enables that the trailing first rotary knife 6 can cut through an artery 11a and vein 12a in the neck 16 of the poultry 3 whilst avoiding to cut the trachea 13, oesophagus 14 and vertebra 18 in the neck 16 of the poultry 3.

In order to arrive at the result mentioned in the previous paragraph the first guide wheel 9 is provided upstream and proximate to the first rotary knife 6, wherein the first guide wheel 9 is positioned substantially alongside the conveying track 7 such that the first rotary knife 6 and the first guide wheel 9 are positioned on opposite sides of the conveying track 7 so as to leave a passageway in this conveying track 7 between the first rotary knife 6 and the first guide wheel 9. The poultry neck 16 is able to pass through this passageway whilst being forced by the first guide wheel 9 into cutting contact with the first rotary knife 6 and whilst the poultry remains essentially vertically suspended. Preferably, for this exemplary embodiment, the first guide wheel 9 is rotatable through contact with the neck 16 of the passing poultry 3.

FIG. 3 and FIG. 4 further show that a second rotary knife 8 is provided alongside the conveying track 7 and downstream of the first rotary knife 6 on a side of the conveying track 7 that is opposite to the side of the first rotary knife 6. The second rotary knife 8 is operative to cut through an artery 11b and vein 12b in the neck 16 of the poultry 3—at the other side of the neck 16 as where the first rotary knife 6 has been operative—while also avoiding to cut the trachea 13, oesophagus 14 and vertebra 18 in the neck 16 of the poultry 3.

FIG. 3 and FIG. 4 show that upstream and proximate to the second rotary knife 8 a second guide wheel 10 is provided, which second guide wheel 10 is positioned alongside the conveying track 7 on the same side of the first guide wheel 9 and the second rotary knife 8. Preferably, for this exemplary embodiment, also the second guide wheel 10 is rotatable through contact with the neck 16 of the passing poultry 3.

Although the invention has been discussed in the foregoing with reference to an exemplary embodiment of the slaughter installation of the invention, the invention is not restricted to this particular embodiment which can be varied in many ways without departing from the invention. It is for instance possible to change the sequence of the first guide wheel 9 and first rotary knife 6 with the second guide wheel 10 and second rotary knife 8. The discussed exemplary embodiment shall therefore not be used to construe the appended claims strictly in accordance therewith. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment.

What is claimed is:

1. A slaughter installation, comprising:
    a conveyor line with carriers for suspending poultry by the legs and conveying the poultry in a conveying track in a transport direction from an upstream end to a downstream end of a killing device, the poultry comprising a neck, a head and a bill;
    the killing device comprising
        a first rotary knife for cutting into the neck of the suspended poultry to cut through an artery or vein in the neck of the poultry while avoiding to cut a trachea, oesophagus, and vertebra in the neck of the poultry; and
        a first guide wheel provided upstream and proximate to the first rotary knife, wherein the first rotary knife and first guide wheel are positioned alongside the conveying track, the first rotary knife and the first guide wheel are positioned on opposite sides of the conveying track so as to leave a passageway between the first rotary knife and the first guide wheel, through which passageway the poultry neck is able to pass while being forced into cutting contact with the first rotary knife.

2. The slaughter installation of claim 1, wherein the installation is arranged to maintain the poultry essentially vertically suspended while the poultry neck passes the passageway between the first rotary knife and the first guide wheel.

3. The slaughter installation of claim 1, wherein a second rotary knife is provided alongside the conveying track and downstream of the first rotary knife on a side of the conveying track that is opposite to the side of the first rotary knife, wherein upstream and proximate to the second rotary knife a second guide wheel is provided, which second guide wheel is positioned alongside the conveying track on the same side of the first guide wheel and the second rotary knife.

4. The slaughter installation of claim 1, the installation comprising head positioning means arranged for forcing the bill of the poultry in a direction opposite to the transport direction of the suspended poultry.

5. The slaughter installation of claim 1, wherein at least one of the first guide wheel and second guide wheel is rotatable through contact with the neck of the passing poultry.

6. A slaughter installation for poultry having a neck, a head, legs, and a bill, the slaughter installation comprising:
    a conveyor line with carriers for suspending poultry by the legs;
    a killing device having an upstream and a downstream end;
    a conveying track positioned adjacent to the killing device, the conveyor line conveying the poultry in the conveying track along a transport direction from the upstream end to the downstream end of the killing device;
    wherein the killing device comprises
        a first rotary knife for cutting into the neck of the suspended poultry to cut through an artery or vein in the neck of the poultry while avoiding to cut a trachea, oesophagus, and vertebra in the neck of the poultry; and
        a first guide wheel provided upstream and proximate to the first rotary knife, wherein the first rotary knife and first guide wheel are positioned alongside the conveying track, the first rotary knife and the first guide wheel are positioned on opposite sides of the conveying track so as to leave a passageway between the first rotary knife and the first guide wheel, through which passageway the poultry neck is able to pass while being forced into cutting contact with the first rotary knife, the first guide wheel further configured for imparting a twisting motion to the poultry so that the bill of the poultry faces in a direction opposite to the transport direction.

7. The slaughter installation of claim 6, wherein the installation is arranged to maintain the poultry essentially vertically suspended while the poultry neck passes the passageway between the first rotary knife and the first guide wheel.

8. The slaughter installation of claim 6, wherein a second rotary knife is provided alongside the conveying track and downstream of the first rotary knife on a side of the conveying track that is opposite to the side of the first rotary knife, wherein upstream and proximate to the second rotary knife a second guide wheel is provided, which second guide wheel is positioned alongside the conveying track on the same side of the first guide wheel and the second rotary knife.

9. The slaughter installation of claim 6, wherein at least one of the first guide wheel and second guide wheel is rotatable through contact with the neck of the passing poultry.

* * * * *